(12) United States Patent
Greene et al.

(10) Patent No.: US 10,325,320 B2
(45) Date of Patent: Jun. 18, 2019

(54) RETIREMENT PLANNING APPLICATION

(71) Applicant: Ameriprise Financial, Inc., Minneapolis, MN (US)

(72) Inventors: Mike R. Greene, Minnetrista, MN (US); Logan C. Clipp, Minneapolis, MN (US); Kim M. Sharan, Laurel Hollow, NY (US); John R. Woerner, Eden Prairie, MN (US); William F. Truscott, Marblehead, MA (US); David Michael Steglich, Minneapolis, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 0 days.

(21) Appl. No.: 14/044,280

(22) Filed: Oct. 2, 2013

(65) Prior Publication Data
US 2014/0039938 A1 Feb. 6, 2014

Related U.S. Application Data

(63) Continuation of application No. 13/494,767, filed on Jun. 12, 2012, now Pat. No. 8,588,556.

(51) Int. Cl.
*G06Q 40/00* (2012.01)
*G06Q 40/08* (2012.01)
*G06Q 40/06* (2012.01)

(52) U.S. Cl.
CPC .......... *G06Q 40/08* (2013.01); *G06Q 40/06* (2013.01)

(58) Field of Classification Search
CPC .................................................. G06Q 40/06
USPC ........................................................ 705/35, 40
See application file for complete search history.

(56) References Cited

U.S. PATENT DOCUMENTS

| | | | |
|---|---|---|---|
| 6,012,043 A | 1/2000 | Albright et al. | |
| 7,050,997 B1 * | 5/2006 | Wood, Jr. ............... | G06Q 40/06 705/36 R |
| 7,315,837 B2 | 1/2008 | Sloan et al. | |
| 7,398,241 B2 | 7/2008 | Fay et al. | |

(Continued)

OTHER PUBLICATIONS

Fidelity Introduces Innovative New Program to Motivate Retiring Investors; http://www.fidelity.com; "Fidelity Investments Takes Retirement Income Planning to a New Level on Behalf of Baby Boomers"; 3 pages; Feb. 2, 2011.

(Continued)

*Primary Examiner* — Edward Chang
(74) *Attorney, Agent, or Firm* — Toler Law Group, PC

(57) ABSTRACT

A method includes receiving first user input indicating selection of a guaranteed income option to fund essential retirement expenses. The method further includes receiving second user input indicating selection of an investment option to fund lifestyle retirement expenses. The method also includes receiving third user input indicating selection of an unexpected liability coverage option, wherein the unexpected liability coverage option includes a long-term care funding option, an unexpected legal expense funding option, or any combination thereof. The method includes receiving fourth user input indicating selection of one or more legacy planning options. The method also includes generating a retirement plan based on the first user input, the second user input, the third user input, and the fourth user input.

6 Claims, 17 Drawing Sheets

(56) References Cited

U.S. PATENT DOCUMENTS

| | | | |
|---|---|---|---|
| 7,647,261 B2 | 1/2010 | Merton et al. | |
| 7,702,527 B1 | 4/2010 | Kron et al. | |
| 7,840,470 B2 | 11/2010 | Robinson | |
| 8,095,398 B2 | 1/2012 | Dellinger et al. | |
| 8,214,238 B1* | 7/2012 | Fairfield | G06Q 10/063 705/7.11 |
| 2002/0073005 A1* | 6/2002 | Welnicki | G06Q 40/00 705/35 |
| 2002/0169702 A1* | 11/2002 | Eaton, Jr. | G06Q 30/02 705/36 R |
| 2004/0054610 A1* | 3/2004 | Amstutz | G06Q 40/02 705/36 R |
| 2004/0088236 A1* | 5/2004 | Manning | G06Q 40/00 705/35 |
| 2007/0288399 A1 | 12/2007 | Reynolds | |
| 2010/0268670 A1 | 10/2010 | Dahlberg et al. | |
| 2011/0131150 A1 | 6/2011 | Golden | |

OTHER PUBLICATIONS

"Taking the Mystery Out of Retirement Planning"; U.S. Dept. of Labor, Employee Benefits Security Administration (EBSA), and its partners.; www.dol.gov/ebsa; Feb. 2010; 66 pages.

O'Neill, Barbara, "Financial catch up: How aging baby boomers can make up for lost time"; Journal of Family and Consumer Sciences 92.2; 2000: 13-15; last updated Jun. 6, 2010.

Creaghan, Peter, "Strategic Partners"; CA Magazine 130.10; Dec. 1997: 37-38+.

U.S. Appl. No. 13/494,767, filed Jun. 12, 2012 26 pages.

* cited by examiner

YOUR RETIREMENT ANALYSIS AND PLAN

Prepared By: Joe Advisor | (123) 456-7890 | joe.advisor@ampf.com

Goals and Objectives:
1. Ensure you can maintain your current lifestyle throughout retirement
2. Live 5 months out of the year in Florida and remaining months at home up north.
3. Spoil grandkids now, but ensure that you can leave dollars at your death.

Financial Data Assumptions:

Assets
$600,000 Tax Deferred
$20,000 Tax Free Upon Withdrawal
$360,000 Taxable

Income
$24,000 Social Security
$20,000 Pension
$0 Other

Expenses
$42,000 Essential
$24,000 Lifestyle
$4,200 Unexpected

Insurance Coverage
$750,000 Client 1
$100,000 Client 2

Principle #1: Guaranteed income for your essentials.
We looked at multiple options to create guaranteed income in order to cover your essential expenses gap. We discussed the advantages, disadvantages, and flexibility of each solution.

| Allocation | Solution | Benefit to Retirement |
|---|---|---|
| $204,000 | CD Strategy | A Certificate of Deposit strategy can create consistent income to cover essentials |

Principle #2: Choose a plan as your expenses evolve.
You decided that pulling no more than 4.5% of our investments was the optimal plan to cover your lifestyle expenses. In order to maintain this you need to allocate $665,000 towards lifestyle income.

| Allocation | Solution | Benefit to Retirement |
|---|---|---|
| $90,000 | Cash | Cash will ensure that you always have a smart place to access money when you need it |
| $120,000 | Fixed Income | This portion of your portfolio will resist asset depletion and help outpace inflation |
| $455,000 | Growth | This portion of your portfolio will provide growth and help outpace inflation |

Principle #3: Prepare for uncertainty. Cover the unexpected.
Covering the unexpected is about planning ahead for potential risks that could get in the way of you maintaining your income or assets throughout retirement.

| Allocation | Solution | Benefit to Retirement |
|---|---|---|
| N/A | LTC Insurance | LTCi can ensure that you do not have to dip into retirement assets to pay for LTC |
| N/A | Umbrella Plcy. | An umbrella policy can cover for unforeseen legal settlements |
| $25,000 | Emergency | This emergency lump sum helps ensure you don't have to dip into retirement assets |

Principle #4: Plan now to give smart.
You identified potential gaps in your plan that could challenge your ability to control where you money goes and leverage the dollars you decide to give.

| Allocation | Solution | Benefit to Retirement |
|---|---|---|
| N/A | Keep Control | Updating beneficiaries and HCD/POA and using trusts help control your legacy |
| $38,000 | Tax-Free $ | Using life insurance will create tax-free dollars upon your death |

*FIG. 15*

RETIREMENT PLANNING APPLICATION

CROSS-REFERENCE TO RELATED APPLICATIONS

The present application is a continuation of, and claims priority from, U.S. patent application Ser. No. 13/494,767, filed on Jun. 12, 2012, and entitled "RETIREMENT PLANNING APPLICATION," the contents of which are hereby incorporated by reference in their entirety.

BACKGROUND

Studies have shown that a small percentage of people actively plan for retirement, and fewer still have enough money saved so that they do not run out of money during retirement. With the number of retirement planning options available, individuals may find retirement planning complicated and confusing. Thus, a substantial number of people will reach the age for retirement, but be unprepared financially for retirement.

SUMMARY

An interactive retirement planning application is disclosed. The application may present a sequence of interactive interfaces to a client and may facilitate two-way communication with a retirement advisor (e.g., via text, audio, and/or video). The retirement planning application may be a one-stop planning tool that addresses four categories of retirement planning: essential expenses, lifestyle/desired expenses, unexpected expenses, and legacy planning. Interactive GUIs may be displayed for each of the four categories, and a customized retirement plan may be provided to a client at the conclusion of a retirement planning session that uses the application. The interactive GUIs may be organized according to a paradigm of presenting a broad principle regarding a particular one of the four categories and product-level options for the client to choose from within the particular category. This organization may facilitate faster and more productive retirement planning sessions.

BRIEF DESCRIPTION OF THE DRAWINGS

FIG. 15 is a diagram to illustrate a particular embodiment of a retirement plan;

DETAILED DESCRIPTION

Figure 1:
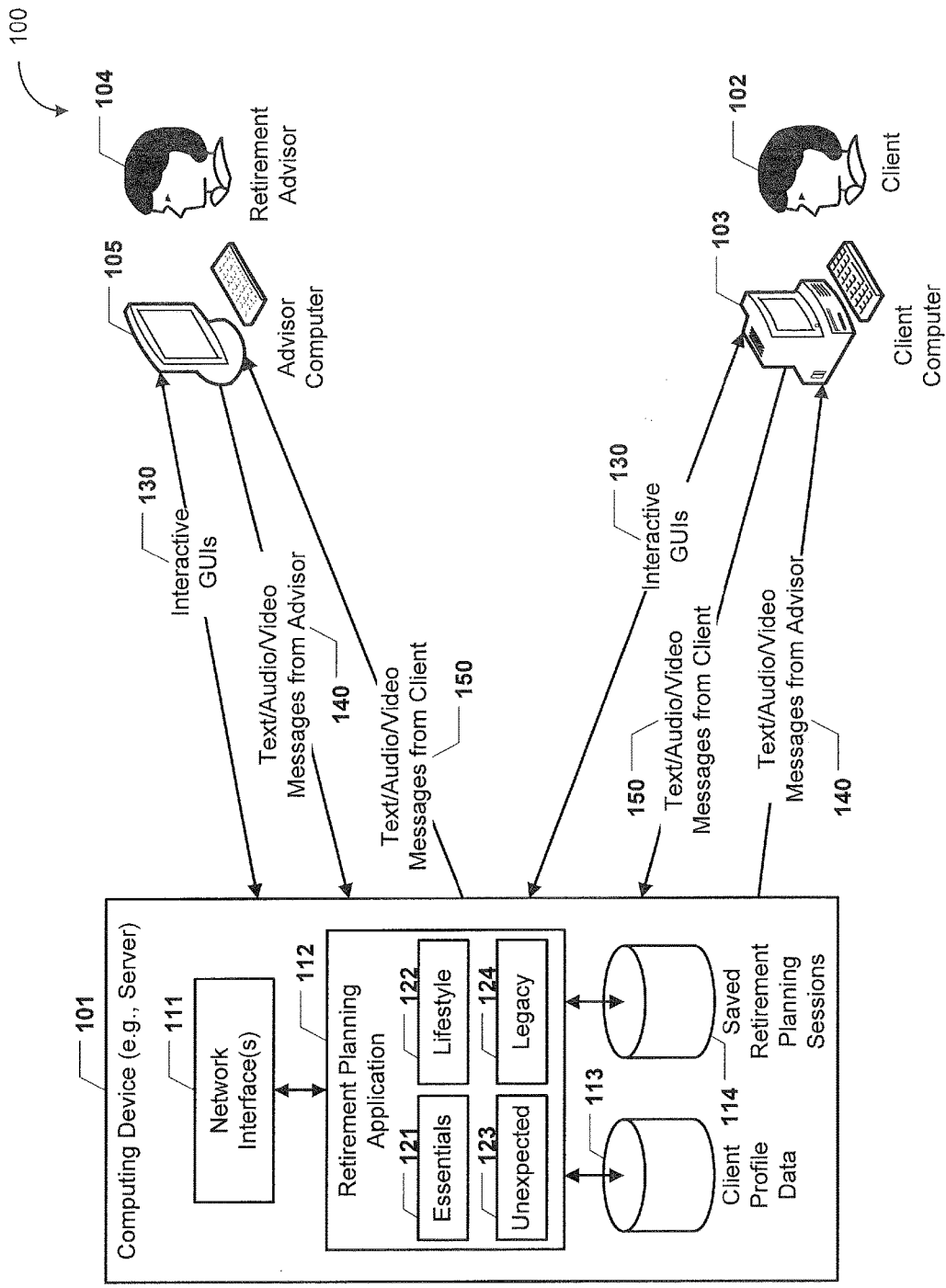
FIG. 1 is a diagram to illustrate a particular embodiment of a system that includes a retirement planning application that is operable to generate a retirement plan.

FIG. 1 illustrates a particular embodiment of a system 100 that includes a retirement planning application 112 that is operable to generate retirement plans. In a particular embodiment, the retirement planning application 112 may be a server-side data processing and analysis application operating on a computing device (e.g., a server) 101 that provides data to or is accessed by one or more client-side applications. For example, interactive GUIs 130 may be displayed by a client-side front-end application or browser and may reflect retirement planning intelligence provided by the retirement planning application 112. The interactive GUIs 130 may be available to a client 102, a retirement advisor 104, and other members of a financial advising and/or retirement planning enterprise as a software program executing on client computers 103 and advisor computers 105, as an Internet-accessible web application executing at the computing device 101, or via some other deployment method.

The computing device 101 (e.g., server) may include at least one network interface 111 (e.g., wired or wireless network interface). The network interface 111 may receive and transmit data related to the interactive GUIs 130 to the client computer 103 and to the retirement advisor computer 105. The retirement planning application 112 may support two-way communication between the client computer 103 and the advisor computer 105 via a network (e.g., the Internet). For example, the network interface 111 may also receive text/audio/video messages 140 from the advisor computer 105 and transmit such messages 140 to the client computer 103. The network interface 111 may also receive text/audio/video messages 150 from the client computer 103 and transmit such messages 150 to the advisor computer 104.

In a particular embodiment, the computing device 101 may store client profile data 113 and saved retirement planning sessions 114. The client profile data 113 may include demographic and financial information associated with clients, such as the client 102. The saved retirement planning sessions 114 may include data associated with sessions of the retirement planning applications 112 that have been suspended while in-progress. As further described herein, clients may pause a retirement planning session and resume the retirement planning session at a subsequent time. In an alternate embodiment, the client profile data 113 and/or the saved retirement planning sessions 114 may be stored external to the retirement planning application 112.

The retirement planning application 112 may be operable to present information in the interactive GUIs 130 and receive information via the interactive GUIs 130 that is related to four categories of retirement expenses/planning: essential expenses, lifestyle expenses, unexpected liability, and legacy planning. For example, the retirement application 112 may include an essentials module 121, a lifestyle module 122, an unexpected module 123, and a legacy module 124, each of which implements business intelligence for the corresponding retirement expenses/planning category. In a particular embodiment, each of the modules 121, 122, 123, and 124 is implemented via processor-executable instructions stored in a memory or other tangible processor-readable medium.

As further described herein, the essentials module 121 may generate a first interactive GUI that identifies essential retirement expenses and/or identifies one or more guaranteed income options to fund the essential retirement expenses. The lifestyle module 122 may generate a second interactive GUI that identifies lifestyle retirement expenses and/or identifies one or more investment options to fund the lifestyle retirement expenses. The unexpected module 123 may generate a third interactive GUI that identifies one or more unexpected liability coverage options. The legacy module 124 may generate a fourth interactive GUI that identifies one or more legacy planning options. Example screenshots of the interactive GUIs 130 that may be generated by the retirement planning application 112 are further described with reference to FIGS. 2-14.

During operation, the retirement planning application 112 may generate a retirement plan, including recommended actions related to funding essential expenses, funding lifestyle expenses, preparing for unexpected liabilities, and legacy planning, in a relatively short session (e.g., 3 hours or less). To illustrate, the client 102 may use the retirement planning application 112 to step through the interactive GUIs 130, with or without assistance from the retirement advisor 104. In a particular embodiment, at each of the interactive GUIs 130, the client may be presented with a broad principle and simplified yet product-specific options for achieving the broad principle.

The retirement planning application 112 may enable faster and more productive retirement planning sessions. Such benefits may be realized by careful selection of what information is presented to the client 102 and careful exclusion of information that may be confusing or complicated. For example, there may be numerous guaranteed income products available in the marketplace. However, the interactive GUIs 130 may only show those products that have been recognized (e.g., by a financial advising company) as simple, popular, and/or reliably performing. Thus, the essentials module 121, the lifestyle module 122, the unexpected module 123, and the legacy module 124 may present simplified options to the client 102 to reduce decision-making complexity. Moreover, the essentials module 121, the lifestyle module 122, the unexpected module 123, and the legacy module 124 may suppress options that are less common or that present a high level of complexity.

It will be appreciated that the system 100 of FIG. 1 may thus provide benefits to various parties associated with the retirement planning process. For example, a financial advising or retirement advising company may benefit from speedy assessment and prioritization of retirement planning options based on client goals. This may encourage more clients to take advantage of retirement planning services offered by the company. In addition, a more holistic (e.g., qualitative as well as quantitative) understanding of retirement goals and opportunities may lead to improved retirement plans, thereby enhancing client satisfaction. Individual advisor practices may also benefit from increased client retention (e.g., a financial advising client remaining with a financial advisor that transitions into a retirement advising role as the client approaches and reaches retirement). Advisors and clients may also benefit from the time saved and improved efficiency enabled by the system 100 of FIG. 1. The system 100 of FIG. 1 may thus enable advisors to assist clients in establishing and planning how to achieve their retirement goals via an easy to use planning tool for quickly generating a comprehensive customized retirement plan. It should be noted that although FIG. 1 illustrates the client 102 and the retirement advisor 104 located remotely from each other, the client 102 and the retirement advisor 104 may instead be collocated (e.g., at an office of the retirement advisor 104) and a single computer (e.g., the advisor computer 105) may be used during a retirement planning session. Alternately, the client 102 and the retirement advisor 104 may be collocated for part of a retirement planning session and remotely located for another part of the retirement planning session.

FIGS. 2-15, described in detail below, illustrate embodiments of the interactive GUIs 130 of the retirement planning application 112 that may be displayed on the client computer 103 of the client 102 (e.g., Mr. and Mrs. Smith) during a retirement planning session. Retirement planning clients may be individuals or couples/families. All or a portion of the interactive GUIs 130 may also be presented on the advisor computer 105 of the advisor 104, if the advisor is discussing or walking through the GUIs 130 with the client 102.

Figure 2:
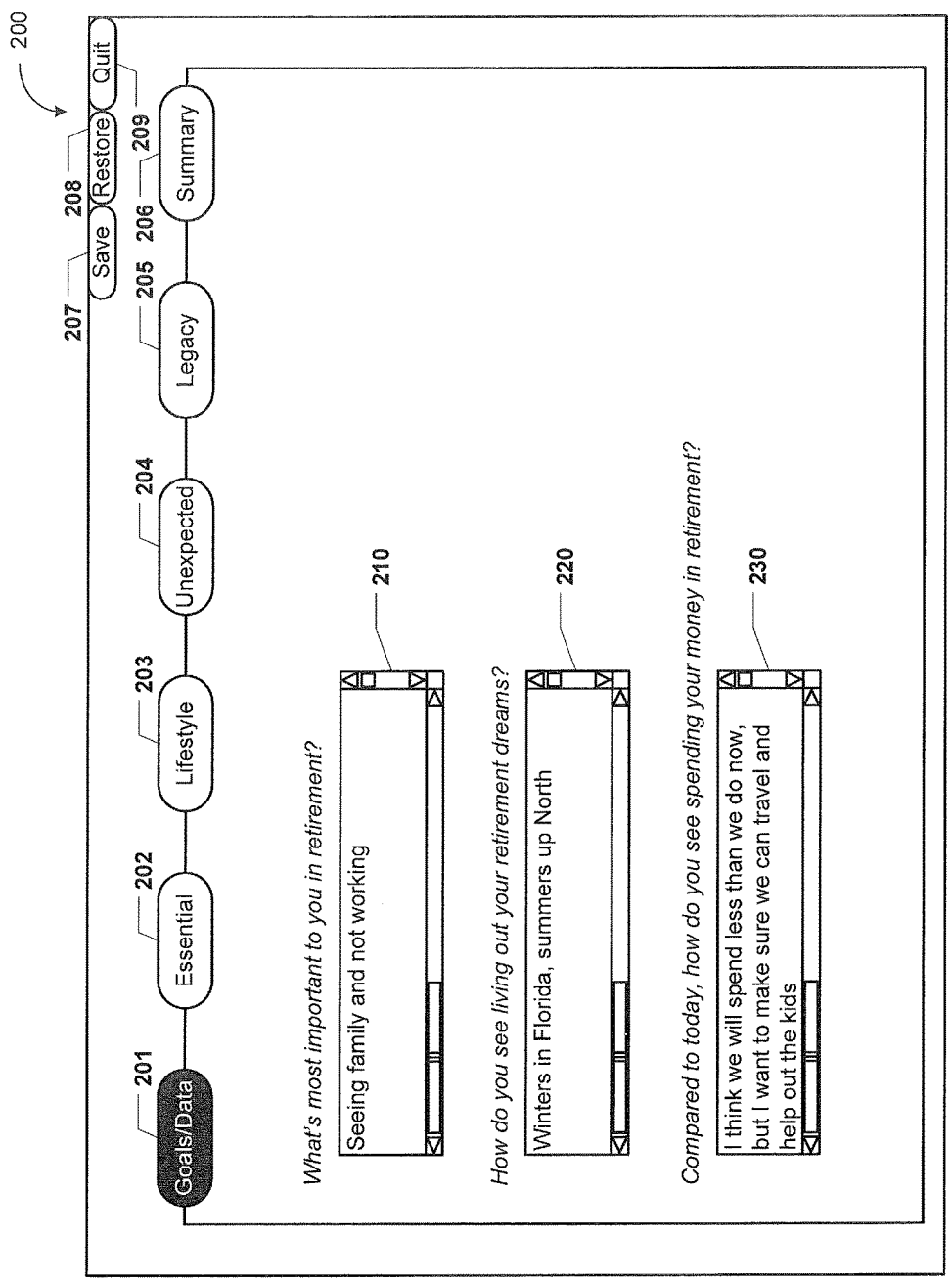
FIG. 2 is a diagram to illustrate a particular embodiment of an interface that is operable to receive and display information regarding retirement goals of a particular client.

FIG. 2 illustrates an embodiment of an interface 200 that is operable to receive and display information regarding retirement goals. The interface 200 may include one or more qualitative questions and may be operable to receive answers from a client. For example, the interface 200 may display a first question "What's most important to you in retirement?" and may include a first text area 210 in which Mr. and Mrs. Smith may enter their answer. In addition, the interface 200 may display a second question "How do you see living out your retirement dreams?" and a second text area 220. Further, the interface 200 may display a third question "Compared to today, how do you see spending your money in retirement?" and a third text area 230. The qualitative answers provided by Mr. and Mrs. Smith may be help the retirement advisor 104 of FIG. 1 better understand Mr. and Mrs. Smith's retirement goals, so that the retirement advisor 104 may tailor subsequent advice to Mr. and Mrs. Smith accordingly.

In a particular embodiment, the interface 200 may include one or more icons to represent the one or more interactive GUIs 130 of the retirement planning application 112. For example, the interface 200 may include an icon 201 representing a goals/data GUI, an icon 202 representing an essential retirement expenses GUI, an icon 203 representing a lifestyle retirement expenses GUI, an icon 204 representing an unexpected retirement expenses GUI, an icon 205 representing a legacy planning GUI, and an icon 206 representing a summary GUI. A highlighted icon may indicate an active GUI. For example, the icon 201 is highlighted in FIG. 2 to indicate that the goals/data GUI is active.

In a particular embodiment, the interface 200 may include controls corresponding to save, restore, and quit commands. For example, a save option 207 may be operable to save an in-progress session of the retirement planning application. In response to the save option 207, the client computer 103 of FIG. 1 may send data to be stored in the saved retirement planning sessions 114 of FIG. 1. A restore option 208 may be operable to restore the previously saved in-progress session. The quit option 209 may be operable to terminate the session of the retirement planning application 112 of FIG. 1. For example, Mr. and Mrs. Smith may save the retirement planning session illustrated in FIGS. 2-14 at any time and may and restore the saved retirement planning session at a later time.

Figure 3:
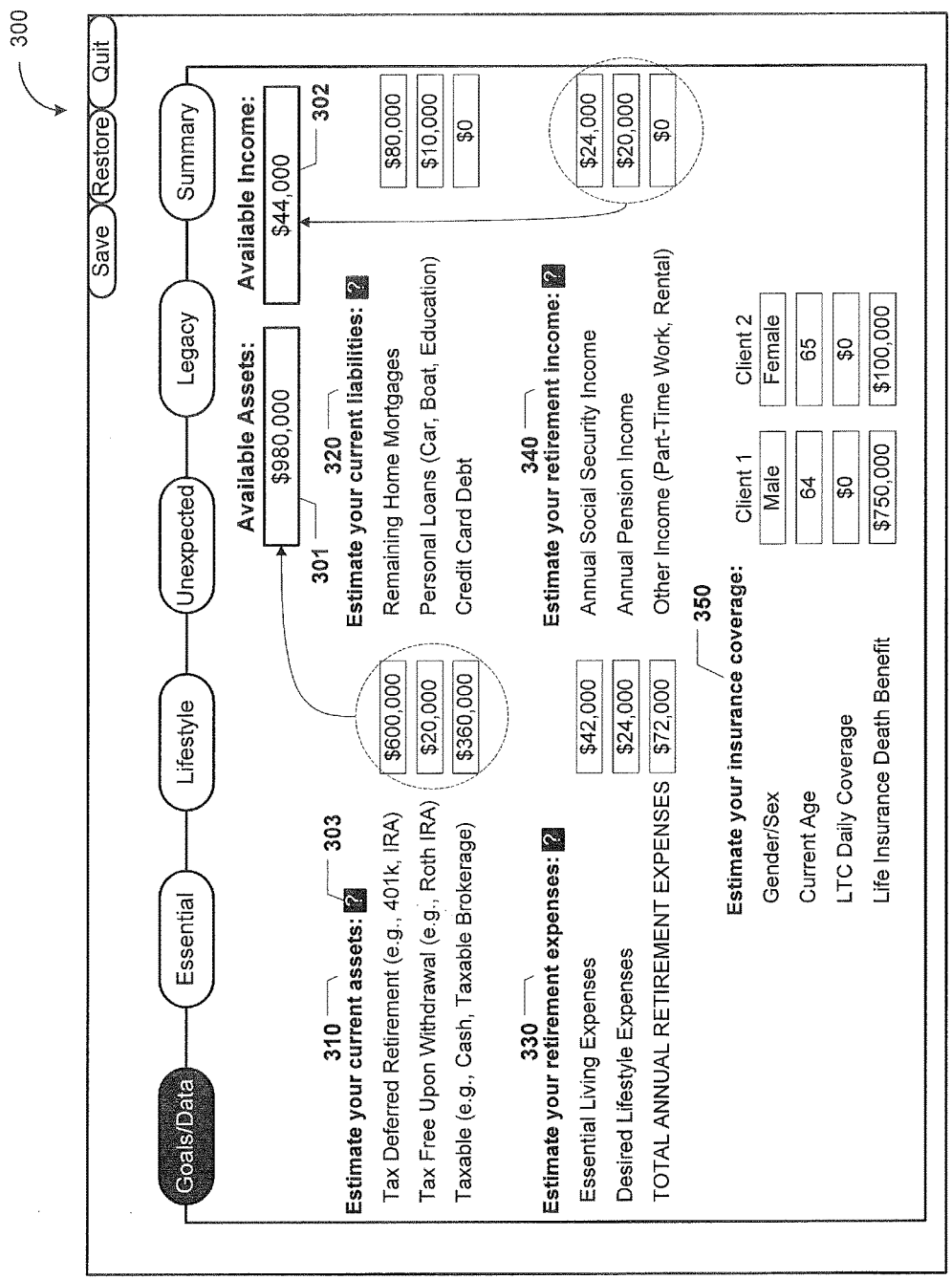
FIG. 3 is a diagram to illustrate a particular embodiment of an interface that is operable to receive and display information identifying assets, liabilities, expected retirement income, and expected retirement expenses of a particular client.

FIG. 3 illustrates an embodiment of an interface 300 that is operable to receive and display information identifying assets, liabilities (e.g., secured and unsecured debt), expected retirement income, expected retirement expenses, and existing insurance coverage. The interface 300 may include one or more questions or otherwise prompt for quantitative information. The interface 300 may include one or more user input elements (e.g., text boxes) for entering answers to the questions. The answers may be stored in the client profile data 113 of FIG. 1 for subsequent retrieval (e.g., to re-populate GUI elements when a previously stored session is resumed). In a particular embodiment, the interface 300 may also be operable to receive information regarding other assets, such as homes and personal property.

For example, current assets 310 may include tax-deferred retirement assets in a 401(k) plan or an individual retirement account (IRA), tax-free-upon-withdrawal assets in a Roth IRA, and/or taxable assets in a taxable brokerage account or a cash account. Current liabilities 320 may include a mortgage, a car loan, a boat loan, an education loan, credit card debt, or any combination thereof. Expected retirement expenses 330 may include essential living expenses (e.g., home costs, utilities, basic food needs, and/or medical expenses), desired lifetime expenses (e.g., hobbies, travel, entertainment, and/or children/grandchildren), or any combination thereof. Expected retirement income 340 may include a social security income, a pension income, a part-time work income, a rental income, or any combination thereof. Existing insurance coverage 350 may include a long-term care daily coverage plan, a life insurance benefit, or any combination thereof. In a particular embodiment, the interface 300 may also be operable to receive user input identifying a desired retirement age (those clients that have already retired may use their current age as the desired retirement age).

The interface 300 may include one or more interactive icons indicating availability of more detailed information. For example, an information icon 303, shown in FIG. 3 as a question mark, may be operable to display explanatory information regarding the current assets 310.

In a particular embodiment, the retirement planning application 112 may dynamically maintain a running count of available assets 301 and available retirement income 302. The values of the available assets 301 and the available retirement income 302 may be dynamically updated as information is exchanged between the client computer 103 and the retirement planning application 112.

For example, as illustrated in FIG. 2, Mr. and Mrs. Smith have current assets 301 totaling $980,000 and have expected retirement income 302 totaling $44,000 annually. The Smiths expect annual essential and lifestyle retirement expenses to be $72,000. Mr. Smith has a $750,000 death benefit on his life insurance policy and Mrs. Smith has a $100,000 death benefit on her life insurance policy.

While entering information into the interface 300, the client 102 of FIG. 1 (e.g., Mr. and Mrs. Smith) may desire assistance from the retirement advisor 104 of FIG. 1. To facilitate such assistance, the client computer 103 and the advisor computer 105 may exchange text, audio, and/or video messages during the retirement planning session, as described above with reference to FIG. 1.

Figure 4:
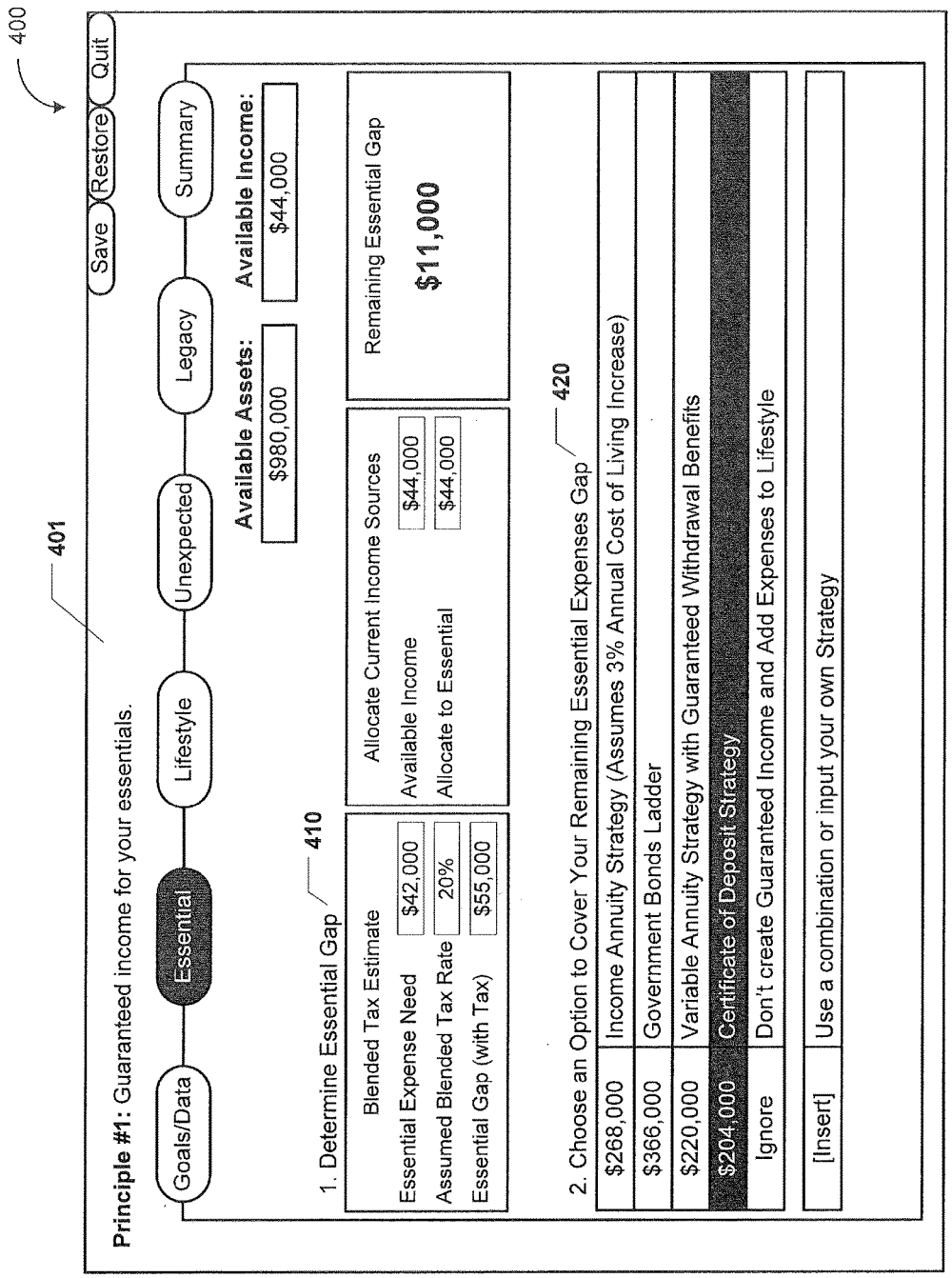
FIG. 4 is a diagram to illustrate a particular embodiment of an interface that identifies essential retirement expenses for a particular client and that is operable to receive a selection of one or more guaranteed income options to fund the essential retirement expenses.

FIG. 4 illustrates an embodiment of interface 400 that identifies essential retirement expenses and that is operable to receive a selection of one or more guaranteed income options to fund the essential retirement expenses. The "Essentials" icon may be highlighted at the top of the interface 400 to indicate that the interface 400 deals with essential retirement expenses.

As explained with reference to FIG. 1, the retirement planning application 112 may utilize a paradigm of displaying a broad principle and presenting product-specific solutions. For example, the interface 400 may display a first broad principle 401 regarding essential retirement expenses: "Principle 1: Guaranteed income for your essentials."

The interface 400 may include an essential gap determination section 410 and a guaranteed income options section 420. In a particular embodiment, the essential gap determination section 410 may display an estimate of an essential gap (with tax), an allocation of available income sources towards the essential gap, and a remaining essential gap. For example, an amount of $42,000 was specified by Mr. and Mrs. Smith as essential living expenses via the interface 300 of FIG. 3. Thus, $42,000 may be indicated as pre-tax essential expense need. The interface 400 may be operable to receive an assumed blended tax rate and may compute a tax-adjusted essential gap. For example, for Mr. and Mrs. Smith, the interface 400 indicates an assumed blended tax rate of 20% and an essential gap (with tax) of $55,000. The essential gap may indicate a tax-adjusted monetary value of the essential living expenses.

The interface 400 may display options to fund the essential gap. For example, of the $55,000, Mr. and Mrs. Smith may choose to fund the first $44,000 with their expected retirement income of $44,000, leaving a remaining essential gap of $11,000.

In a particular embodiment, interface 400 may display one or more guaranteed income options to cover the remaining essential gap. The one or more guaranteed income options may include an option to purchase an income annuity, an option to purchase a fixed income asset (e.g., a government bond), an option to purchase a variable annuity with guaranteed withdrawal, an option to purchase a split annuity, an option to purchase a certificate of deposit, an option to treat the essential retirement expenses as part of lifestyle retirement expenses, or any combination thereof. In addition, an option to input a strategy and/or to use a combination of options may also be provided. In the example of FIG. 4, Mr. and Mrs. Smith have elected a certificate of deposit (CD) strategy, which has an associated cost of $204,000. The selection of the CD strategy may be transmitted from the client computer 103 of FIG. 1 to the retirement planning application 112 of FIG. 1, and may be visually reflected via highlighting as shown in FIG. 4. In a particular embodiment, before essential retirement expenses are calculated as shown in FIG. 4, a client may be given an option to allocate a portion of available assets to immediate needs (e.g., upcoming large purchases, debt repayment, or an income bridge until a confirmed income source provides income). For example, Mr. and Mrs. Smith may elect to allocate a portion of the $980,000 in available assets to pay off a debt obligation, which may impact the essential gap calculation.

Figure 5:
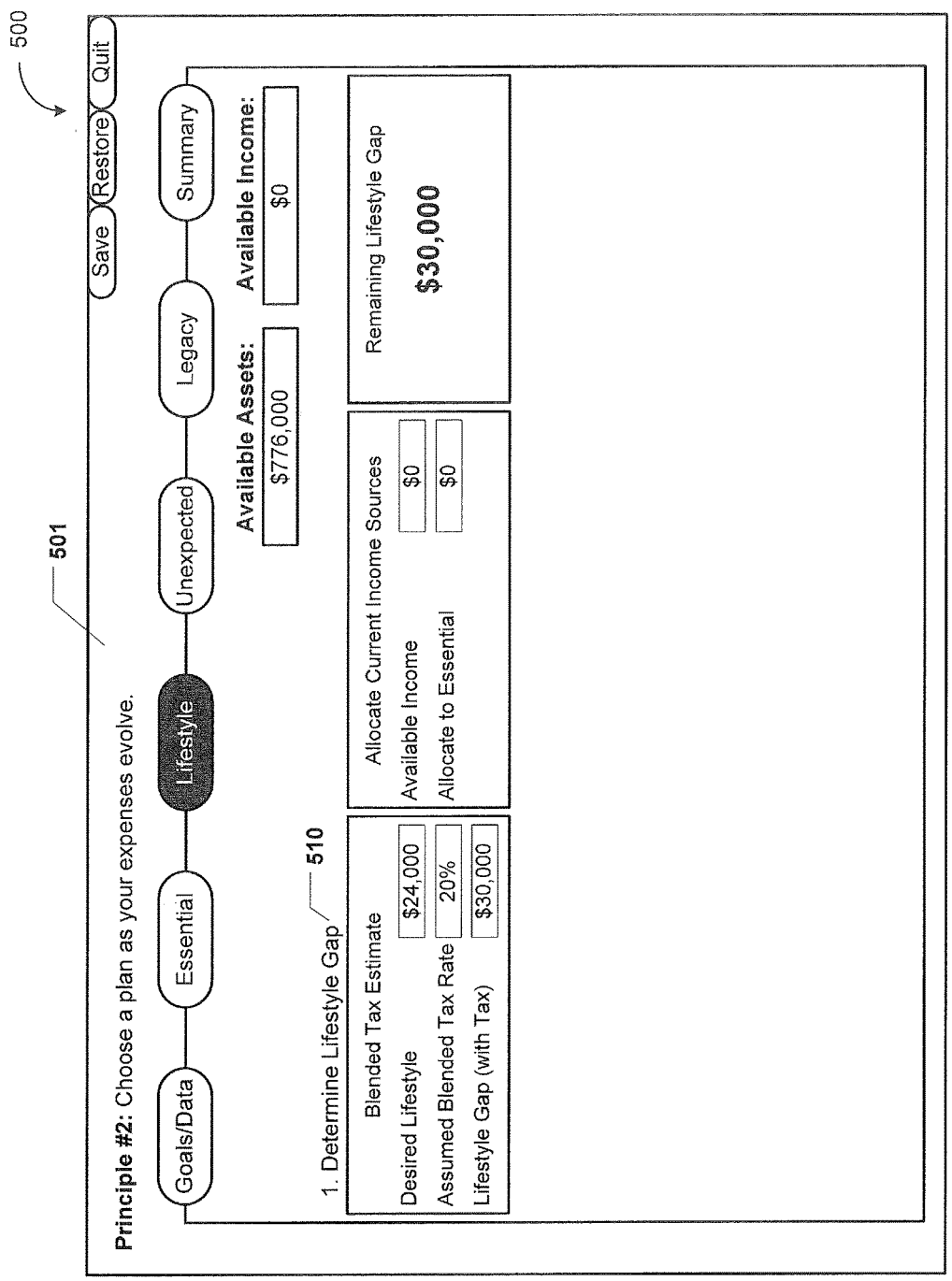
FIG. 5 is a diagram to illustrate a particular embodiment of an interface that identifies lifestyle retirement expenses for a particular client.

FIG. 5 illustrates an embodiment of interface 500 that identifies lifestyle retirement expenses for the client 102. The interface 500 may display a second broad principle 501: "Principle 2: Choose a plan as your expenses evolve." In addition, the available assets and/or available income counters at the top of the interface 500 may be dynamically updated by the retirement planning application 112 to reflect the selections related to one or more previously displayed interactive GUIs 130. For example, as shown in FIG. 5, an updated value of $776,000 may be displayed for available assets to reflect a reduction in the initial available assets of $980,000 by the $204,000 cost of the CD strategy. Similarly, an updated value of $0 may be displayed for available retirement income to reflect the allotment of all $44,000 of expected retirement income to fund Mr. and Mrs. Smith's essential retirement expenses.

The interface 500 may include a lifestyle gap determination section 510. In a particular embodiment, the lifestyle gap determination section 510 may display an estimate of a lifestyle gap (with tax) for the client 102, an allocation of available income sources towards the lifestyle gap, and a remaining lifestyle gap. For example, Mr. and Mrs. Smith estimated annual lifestyle retirement expenses of $24,000 in the interface 300 of FIG. 3. As described above with reference to the essential retirement expenses gap of FIG. 4, the interface 500 may compute a tax-adjusted lifestyle retirement expenses gap (e.g., $30,000 for Mr. and Mrs. Smith). Moreover, because Mr. and Mrs. Smith do not have any remaining available retirement income for allocation, a remaining lifestyle gap to be funded may be the entire $30,000, as shown in FIG. 5.

After determining the remaining lifestyle expenses gap, the retirement planning application 112 of FIG. 1 may facilitate building an investment plan to fund the gap. For example, FIG. 6 illustrates an embodiment of interface 600 that is operable to receive a withdrawal rate and identify an investment amount to fund lifestyle retirement expenses.

The interface 600 may include a graphical display indicating a scale of withdrawal rates 610 ranging from conservative to aggressive. The interface 600 may also indicate where a selected withdrawal rate 620 falls on the scale. The interface 600 may include a withdrawal rate selection section 630. The withdrawal rate selection section 630 may include a user input for entering or altering the selected withdrawal rate. In addition, the withdrawal rate selection section 630 may be operable to display an investment amount that is dynamically adjusted based at least in part on the withdrawal rate. As the withdrawal rate and investment amount (identified in FIG. 6 as "Assets Needed") change, the interface 600 may dynamically update the running count of available assets at the top of the interface 600. To illustrate, in the example of FIG. 6, Mr. an Mrs. Smith have selected a moderately conservative withdrawal rate of 5%, which results in an investment amount of $600,000 and causes the available assets counter to be updated to $176,000.

In a particular embodiment, the interface 600 may include an information icon 640 indicating availability of more information (e.g., regarding sustainable withdrawal rates). For example, Mr. and Mrs. Smith may want more information regarding withdrawal rates before settling on 5%, and may thus click on the information icon 640.

Figure 6:
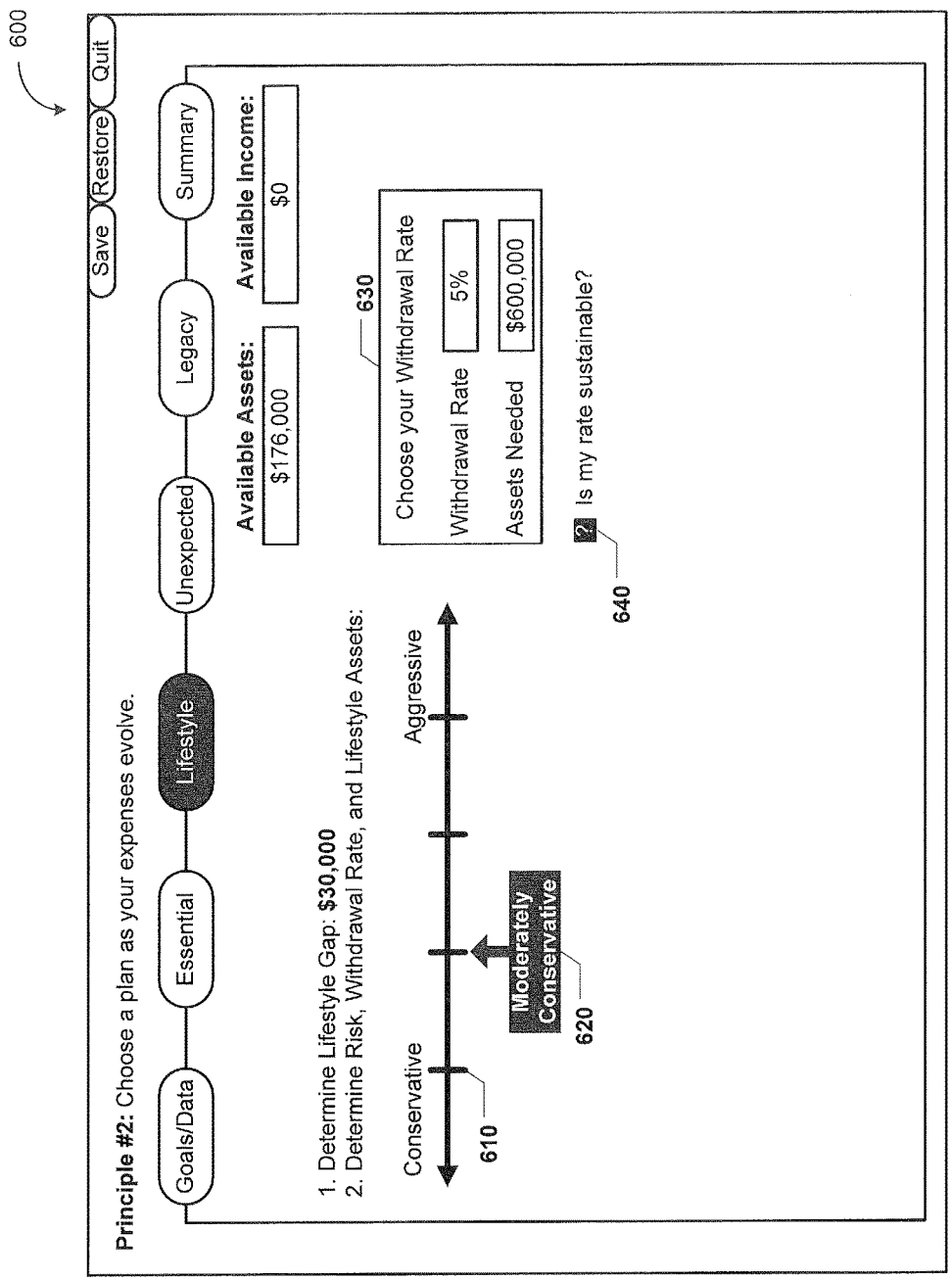
FIG. 6 is a diagram to illustrate a particular embodiment of an interface that is operable to receive a withdrawal rate and to identify an investment amount to fund lifestyle retirement expenses for a particular client.
Figure 7:
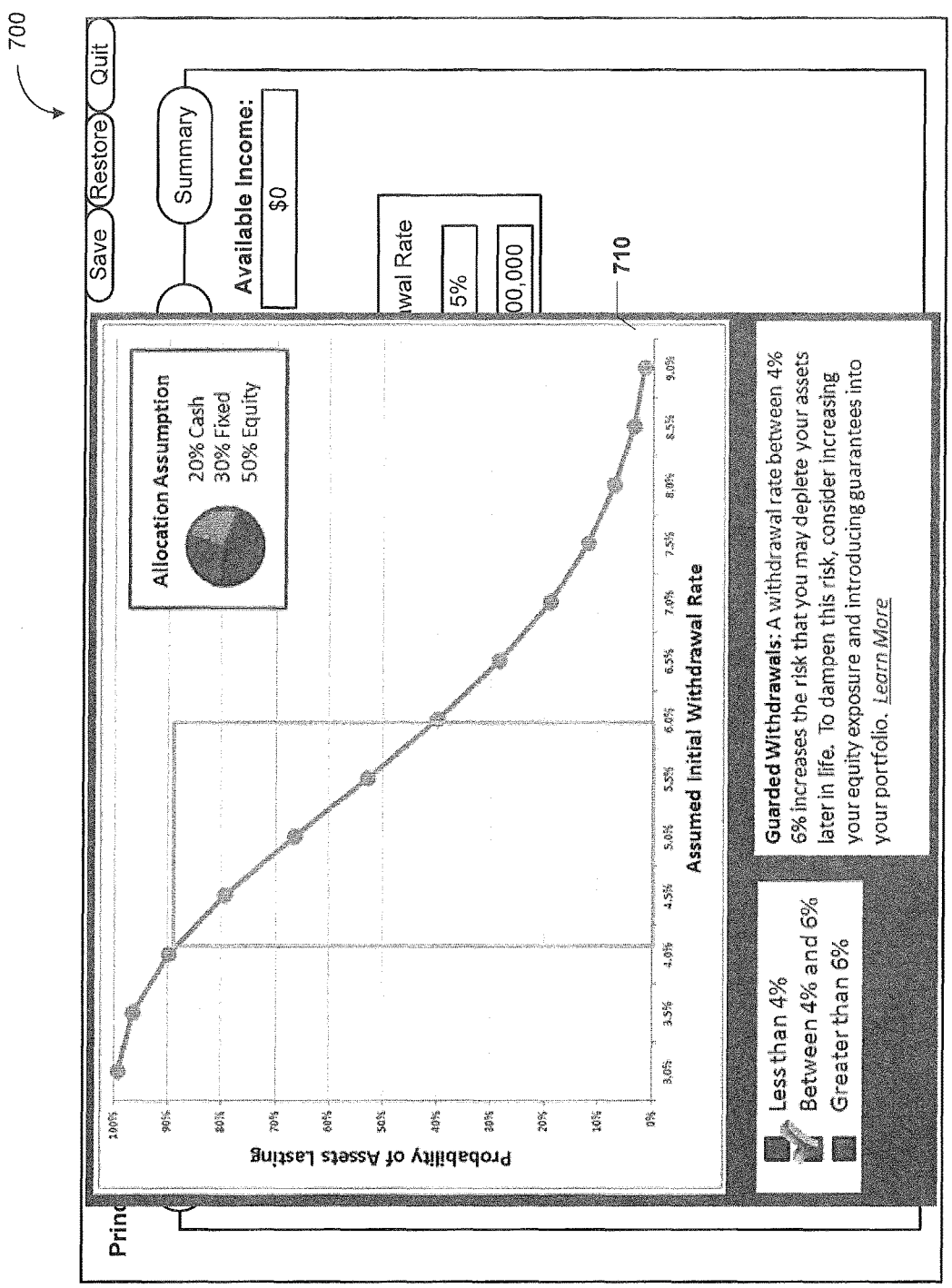
FIG. 7 is a diagram to illustrate a particular embodiment of an interface that displays a probability of assets lasting through retirement based on a selected withdrawal rate.

FIG. 7 illustrates a particular embodiment of an interface 700 that is displayed in response to selection of the icon 640 of FIG. 6. The interface 700 may display a graph 710 of the probability of assets lasting through retirement vs. selected withdrawal rates. The retirement advisor 104 of FIG. 1 may explain the graph 710 to Mr. And Mrs. Smith. In particular, the retirement advisor 104 may explain that the originally selected withdrawal rate of 5% results in approximately a 68% probability that their assets will last through retirement. The retirement advisor 104 may recommend that Mr. and Mrs. Smith reduce their withdrawal rate to 4.5%, thereby increasing the probability of their assets lasting through retirement to approximately 80%.

Figure 8:
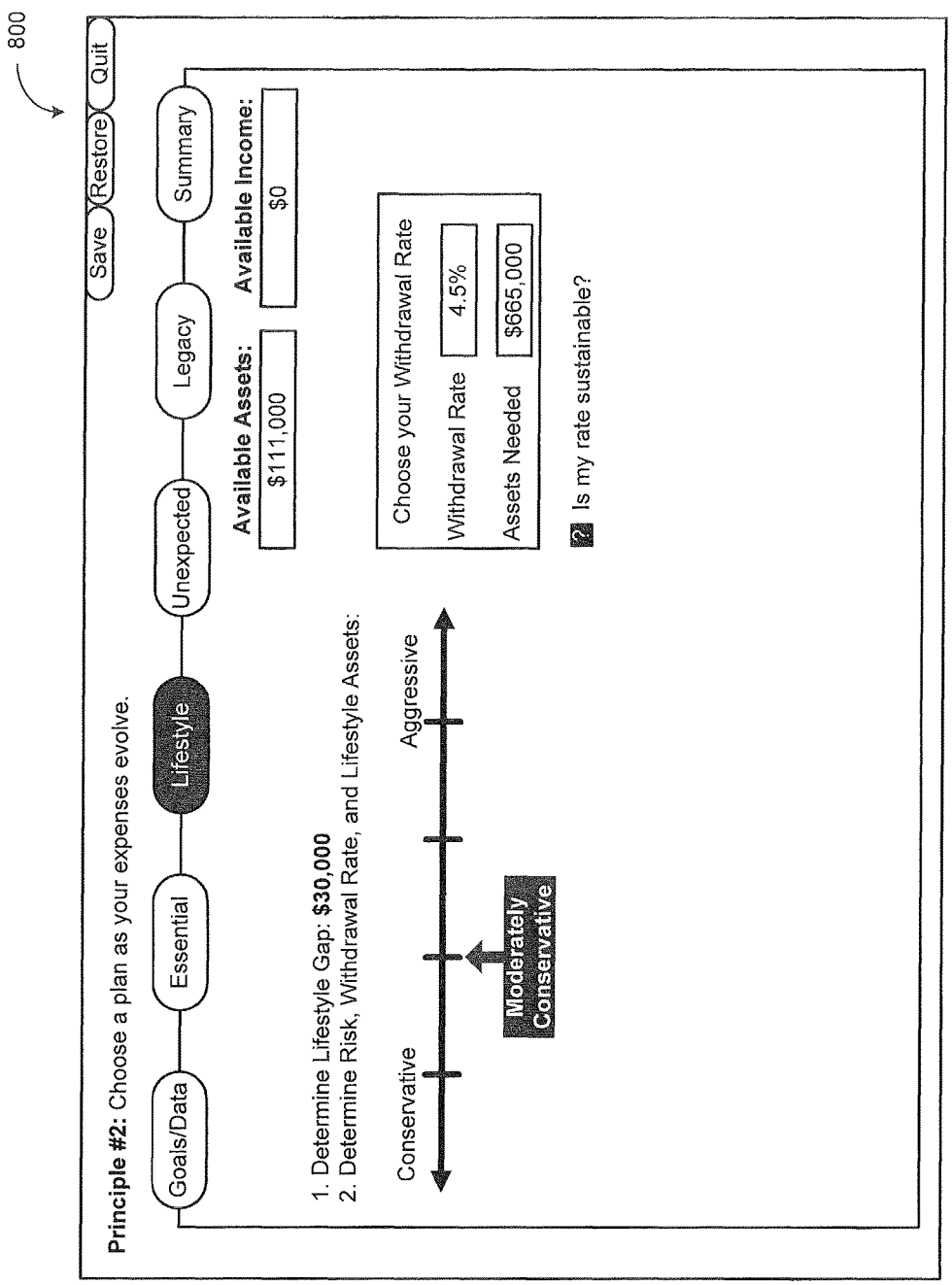
FIG. 8 is a diagram to illustrate another particular embodiment of an interface that is operable to receive a withdrawal rate and to identify an investment amount to fund lifestyle retirement expenses for a particular client.

FIG. 8 illustrates a particular embodiment of an interface 800 that is operable to receive a withdrawal rate and to identify an investment amount to fund lifestyle retirement expenses. In response to the information shown in the graph 710 of FIG. 7, Mr. and Mrs. Smith may decide to reduce their withdrawal rate to 4.5%, as shown in FIG. 8. This reduction in withdrawal rate may result in an increase in the investment amount to $665,000. This increase may be reflected in the running count of available assets, which is reduced to $111,000 in FIG. 8. After determining a withdrawal rate, Mr. and Mrs. Smith may build an investment plan, as illustrated in FIG. 9.

Figure 9:
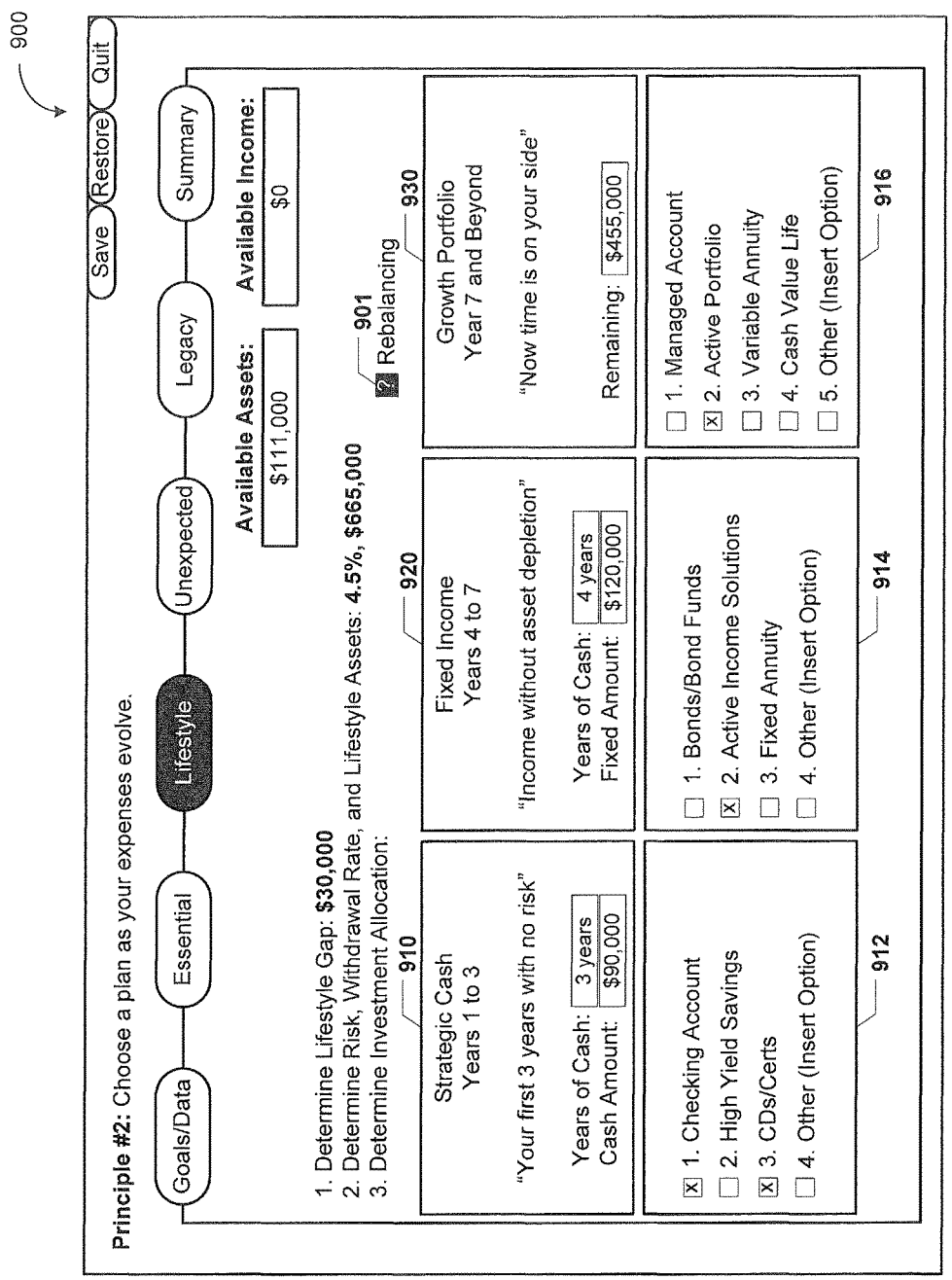
FIG. 9 is a diagram to illustrate a particular embodiment of an interface that is operable to receive input regarding an investment plan to fund lifestyle retirement expenses for a particular client.
Figure 10:
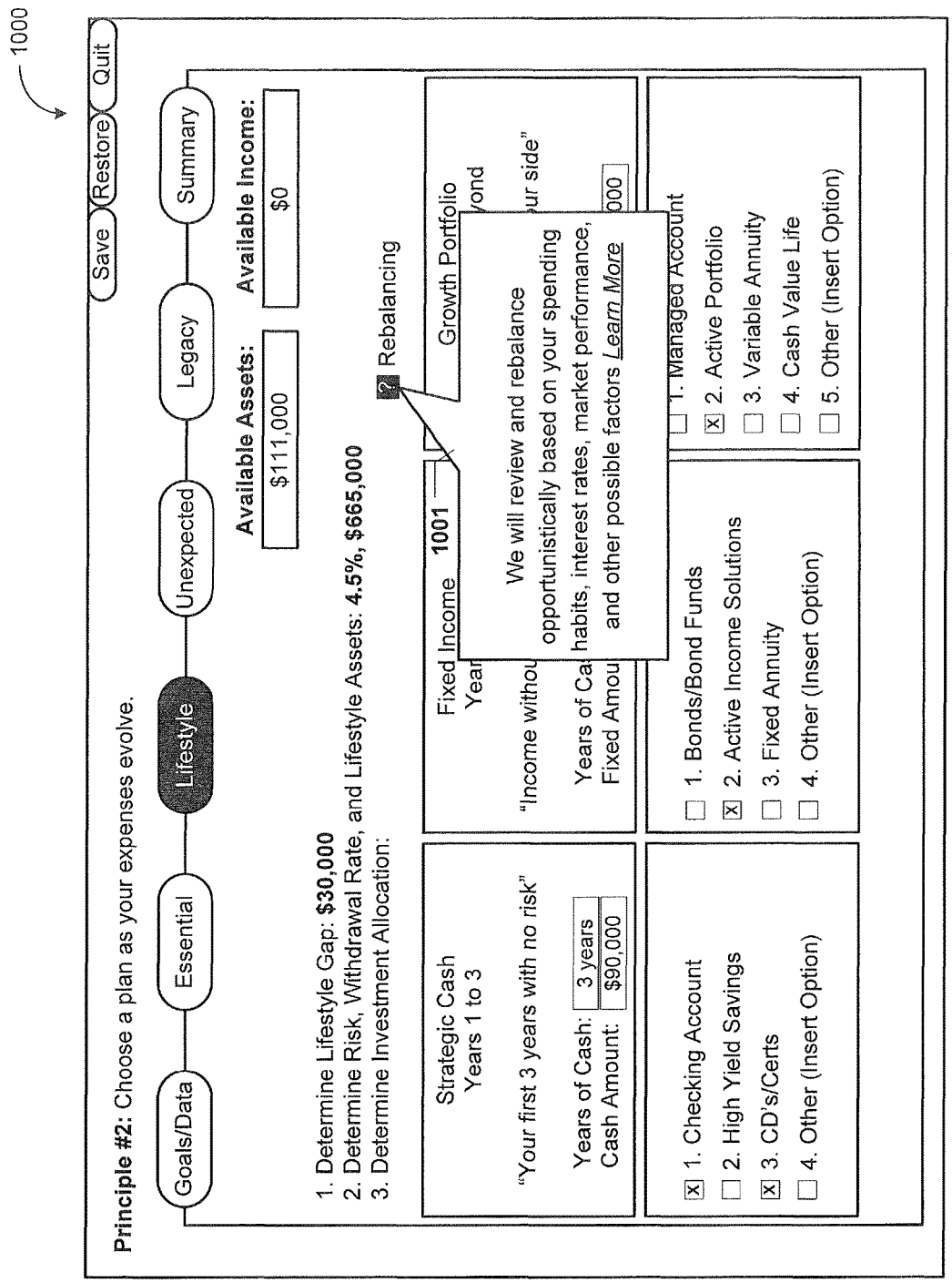
FIG. 10 is a diagram to illustrate another particular embodiment of an interface that is operable to receive input regarding an investment plan to fund lifestyle retirement expenses for a particular client.

FIG. 9 illustrates a particular embodiment of an interface 900 that is operable to receive a selection of one or more investment options to fund lifestyle retirement expenses. For example, an investment plan may be selected to fund essential retirement expenses. The investment plan may include one or more years of strategic cash investments, one or more years of fixed income investments, and one or more years of growth investments.

Strategic cash investments may include a checking account, a savings account, a certificate of deposit (CD), or any combination thereof. Fixed income investments may include a bond, a bond fund, an active income solution, a fixed annuity, or any combination thereof. Growth investments may include a managed investment account, an active portfolio, a variable annuity, a cash value life insurance policy, or any combination thereof.

Thus, the interface 900 may include a strategic cash section 910, a fixed income section 920, and a growth portfolio section 930. The interface 900 may also include a strategic cash options sections 912, a fixed income options section 914, and/or a growth portfolio options section 916. For example, Mr. and Mrs. Smith have selected 3 years and $90,000 for strategic cash investments in checking account(s) and CDs. Mr. and Mrs. Smith have also selected 4 years and $120,000 of fixed income investments in active income solutions, and the remaining balance of $455,000 in an active portfolio targeted for growth.

In a particular embodiment, the interface 900 may include an information icon 901 indicating availability of more information regarding manual or automatic rebalancing of Mr. and Mrs. Smith's investment portfolio. In response to selection of the icon 901, more information regarding rebalancing may be provided. For example, as shown in the interface 1000 of FIG. 10, an overlay 1001 may be displayed. The overlay 1001 may indicate that the retirement advisor or retirement planning company may opportunistically review and rebalance Mr. and Mrs. Smith's portfolio, if authorized to do so by Mr. and Mrs. Smith, based on factors such as spending habits, interest rates, and market performance.

Figure 11:
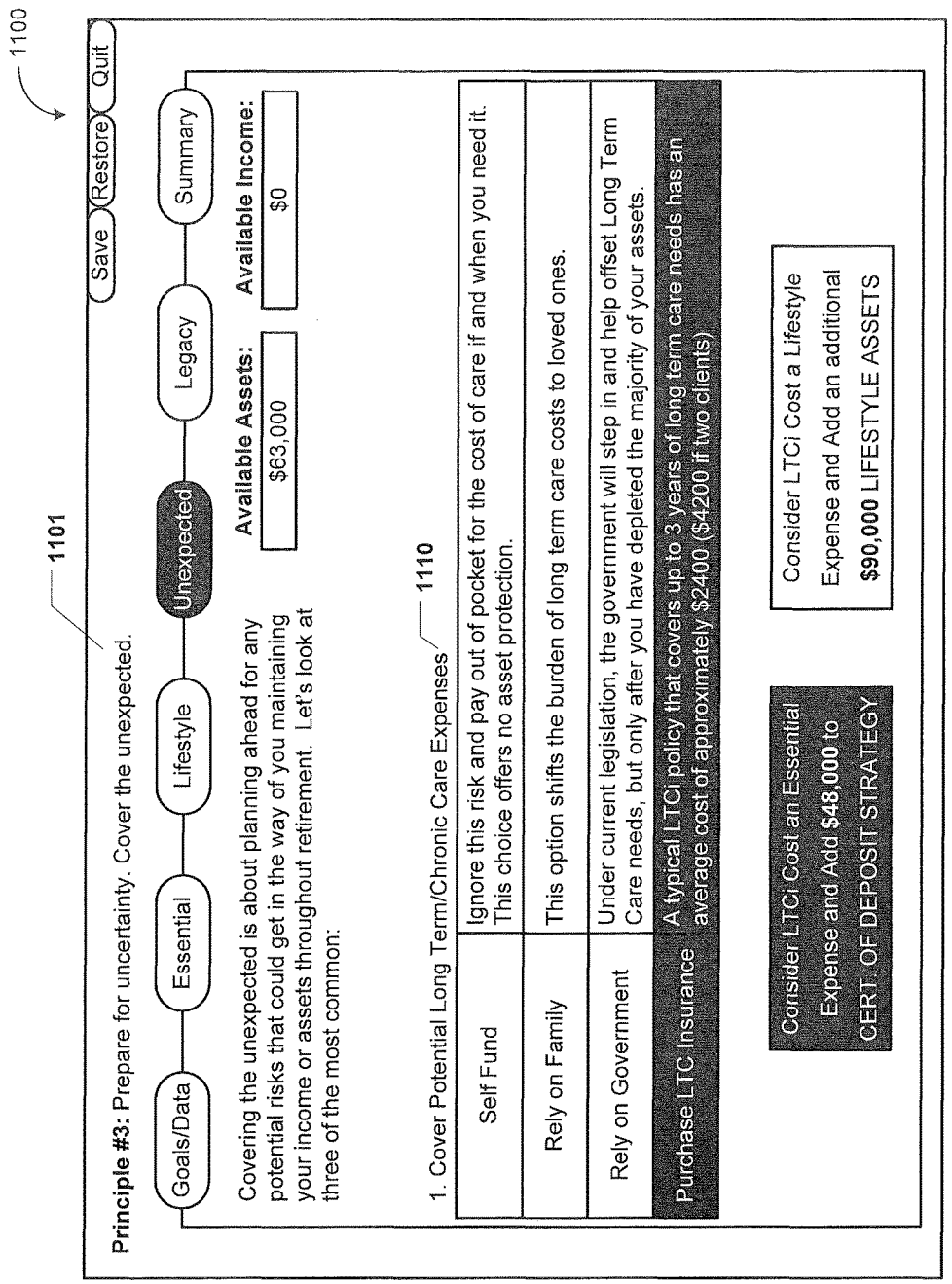
FIG. 11 is a diagram to illustrate a particular embodiment an interface that identifies unexpected retirement expenses and that is operable to receive a selection of one or more unexpected liability coverage options for a particular client.

FIG. 11 illustrates a particular embodiment of an interface 1100 that identifies unexpected retirement expenses and that is operable to receive a selection of one or more unexpected liability coverage options 1110. The interface 1100 may display a third broad principle 1101: "Principle 3: Prepare for uncertainty. Cover the unexpected." The unexpected liability coverage options 1110 may include a self-fund option, a family reliance option, a government reliance option, an option to purchase long-term care (LTC) insurance (LTCi), or any combination thereof.

In a particular embodiment, if the option to purchase LTCi is selected, the interface 1100 may display choices of how to fund the purchase. For example, the choices may include considering the LTCi an essential retirement expense or a lifestyle retirement expense. In the example, of FIG. 11, Mr. and Mrs. Smith select the options "Purchase LTC Insurance" and "Consider LTCi Cost an Essential Expense and Add $48,000 to CERT. OF DEPOSIT STRATEGY," which reduces the running available assets count to $63,000.

Figure 12:
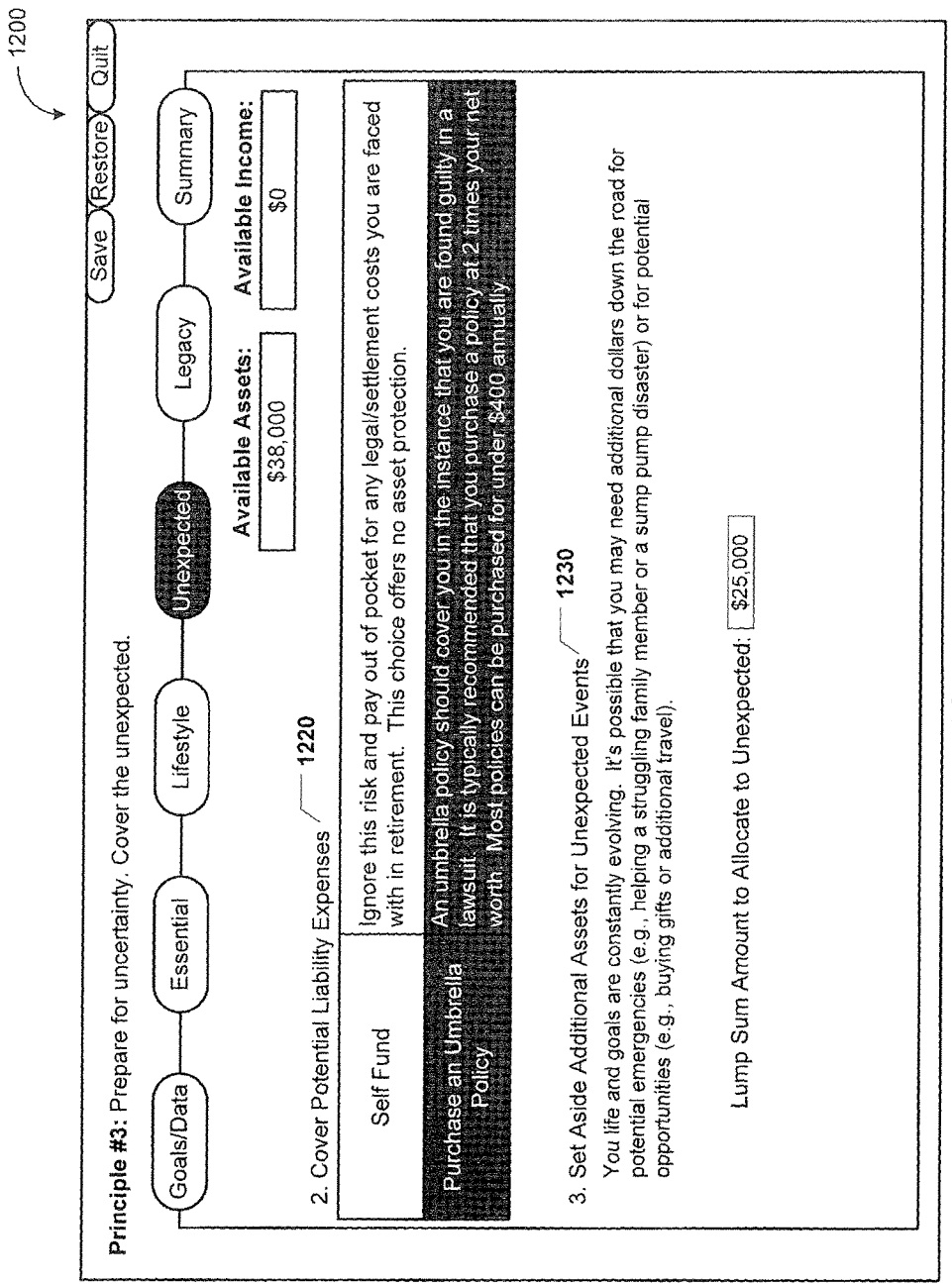
FIG. 12 is a diagram to illustrate another particular embodiment of an interface that identifies unexpected retirement expenses and that is operable to receive a selection of one or more unexpected liability coverage options for a particular client.

FIG. 12 illustrates another embodiment of an interface 1200 that identifies the unexpected retirement expenses and that is operable to receive the selection of unexpected retirement expenses coverage options. The interface 1200 may include a legal liability section 1220. The legal liability section 1220 may include unexpected retirement expenses coverage options for legal liability, such as self-funding and purchasing an umbrella policy. As shown in FIG. 12, Mr. and Mrs. Smith may select to purchase an umbrella policy.

The interface 1200 may also include a section 1230 regarding setting aside additional assets. As shown in FIG. 12, Mr. and Mrs. Smith have elected to set aside an additional $25,000 of assets for unexpected events, leaving $38,000 in available assets. In a particular embodiment, the interface 1200 may be operable to receive account information associated with an account from which the $25,000 lump sum of additional assets is to be provided.

Figure 13:
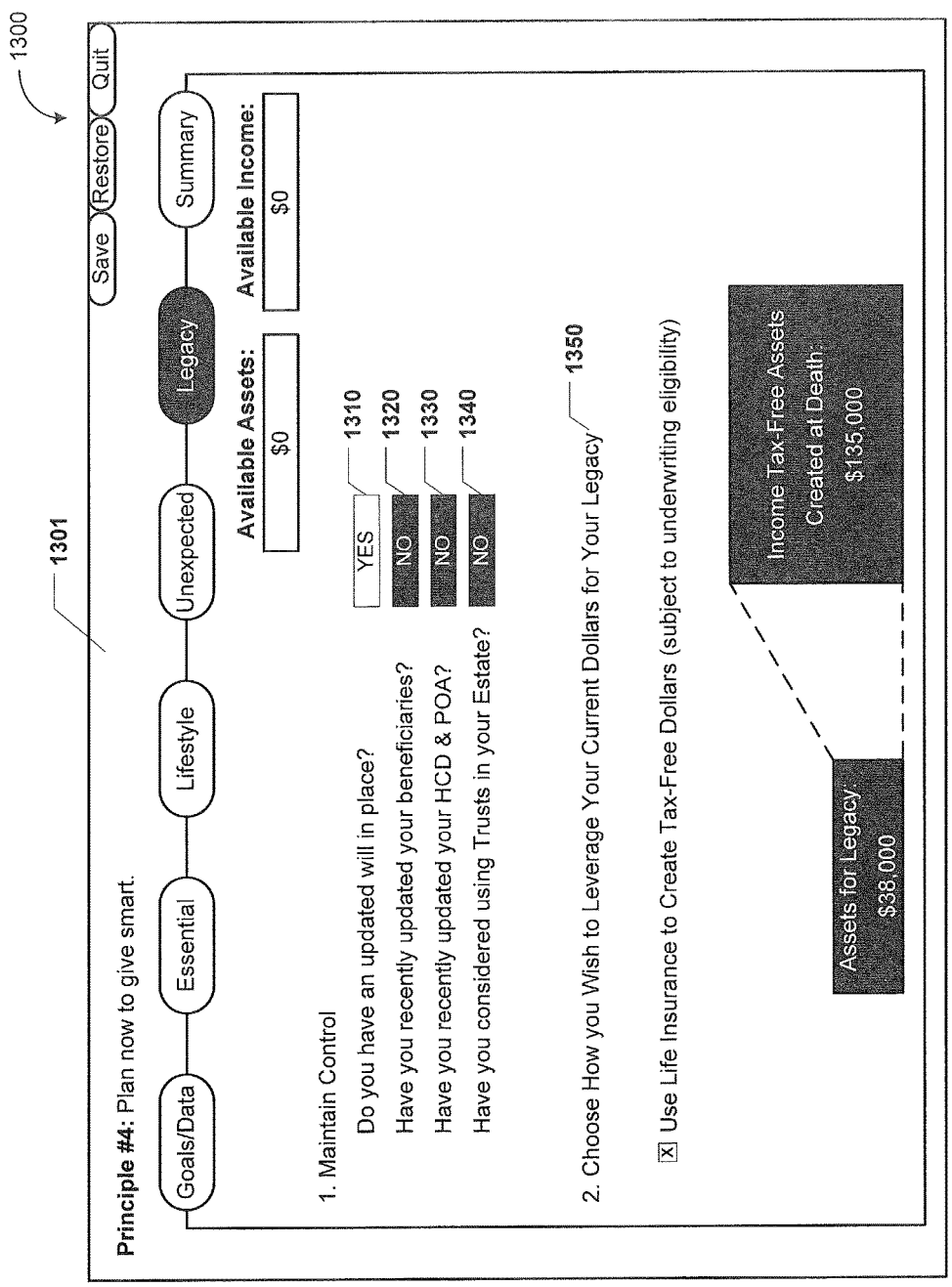
FIG. 13 is a diagram to illustrate a particular embodiment of an interface that is operable to display reminders regarding legacy planning and that is operable to receive a selection of one or more legacy planning options for a particular client.

FIG. 13 illustrates an embodiment of an interface 1300 that is operable to display reminders regarding legacy planning to receive a selection of one or more legacy planning options. The interface 1300 may display a fourth broad principle 1301: "Principle 4: Plan now to give smart."

Reminders regarding legacy planning may include a reminder 1310 regarding a will, a reminder 1320 regarding beneficiaries, a reminder 1330 regarding a health care directive (HCD) and a power of attorney (POA), a reminder 1340 regarding trusts, or any combination thereof. As illustrated in FIG. 13, Mr. and Mrs. Smith have indicated that they have an updated will in place but have not recently updated beneficiaries, HCD, or POA and have not considered using trusts in their estate. The reminders 1320-1340 highlighted "NO" may result in specific recommendations that are included in a retirement plan for Mr. and Mrs. Smith.

The interface 1300 may also identify other legacy planning options 1350, such as an option to use life insurance to create tax free legacy assets. In the example of FIG. 13, Mr. and Mrs. Smith have chosen to use their remaining $38,000 of assets to create $135,000 of tax-free assets. In a particular embodiment, the interface 1300 may be operable to receive data identifying a desired annual giving amount.

Figure 14:
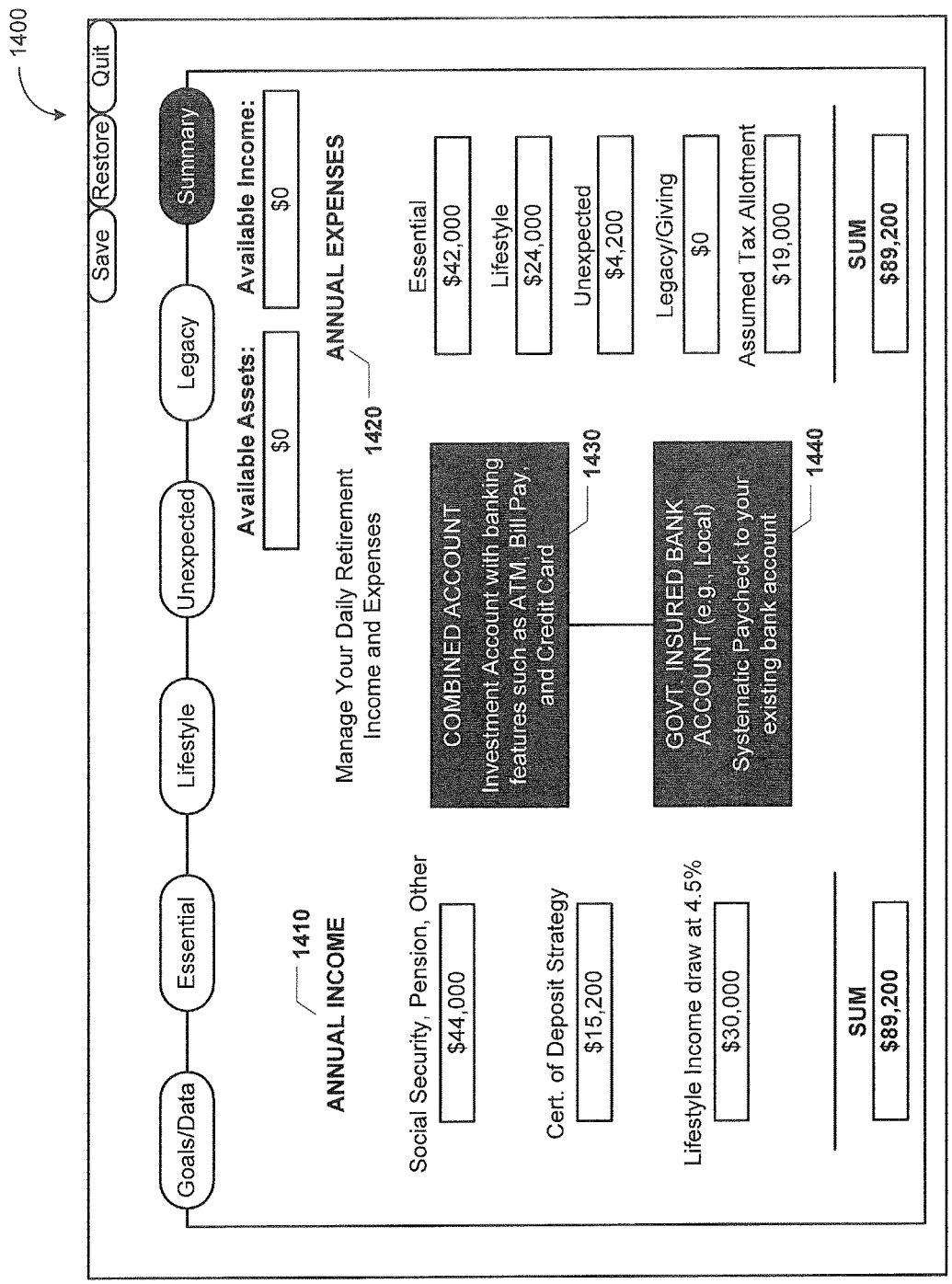
FIG. 14 is a diagram to illustrate a particular embodiment of an interface that is operable to receive a selection of one or more bank accounts of a particular client to associate with a retirement plan.

FIG. 14 illustrates an embodiment of an interface 1400 that is operable to receive a selection of one or more bank accounts to associate with a retirement plan.

As shown in FIG. 14, the interface 1400 may summarize annual income 1410 and annual expenses 1420 for the client Mr. and Mrs. Smith. The values for the annual income 1410 and the annual expenses 1420 may have previously been entered into or computed by the GUIs of FIGS. 2-13.

The interface 1400 may also be operable to associate one or more financial accounts with a retirement plan. In a particular embodiment, the accounts may include a combined investment and cash management account 1430 and/or a government insured account 1440. The combined investment and cash management account 1430 may include features of an investment account as well as banking features such as automated teller machine (ATM), bill pay, and credit card. The government insured account 1440 may be a local bank account of the client.

Although the foregoing description is directed to generating a retirement plan, in a particular embodiment, the retirement planning application 112 of FIG. 1 may also be operable to implement portions of the retirement plan. For example, the retirement planning application 112 may be part of or connected to a financial services platform that enables product purchases and sales. When one or more bank accounts of a client are associated with the retirement plan, the retirement planning application 112 may implement specific recommendations in the retirement plan. For example, after Mr. and Mrs. Smith select the $204,000 CD strategy of FIG. 4, the retirement planning application 112 may schedule and/or perform monetary withdrawals and begin implementing the CD strategy. Thus, when authorized by a client, the retirement planning application 112 may not only generate a retirement plan but may also provide seamless implementation of the retirement plan.

FIG. 15 illustrates a particular embodiment of a retirement plan 1500 generated by the retirement planning application described herein.

The retirement plan 1500 may provide a summary of the principles involved and solution(s) chosen by a client for each of the four categories of retirement planning—essentials, lifestyle, unexpected, and legacy. For example, as illustrated in FIG. 15, the retirement plan 1500 reflects user input and selections made for essential, lifestyle, unexpected, and legacy planning in FIGS. 2-14.

Figure 16:
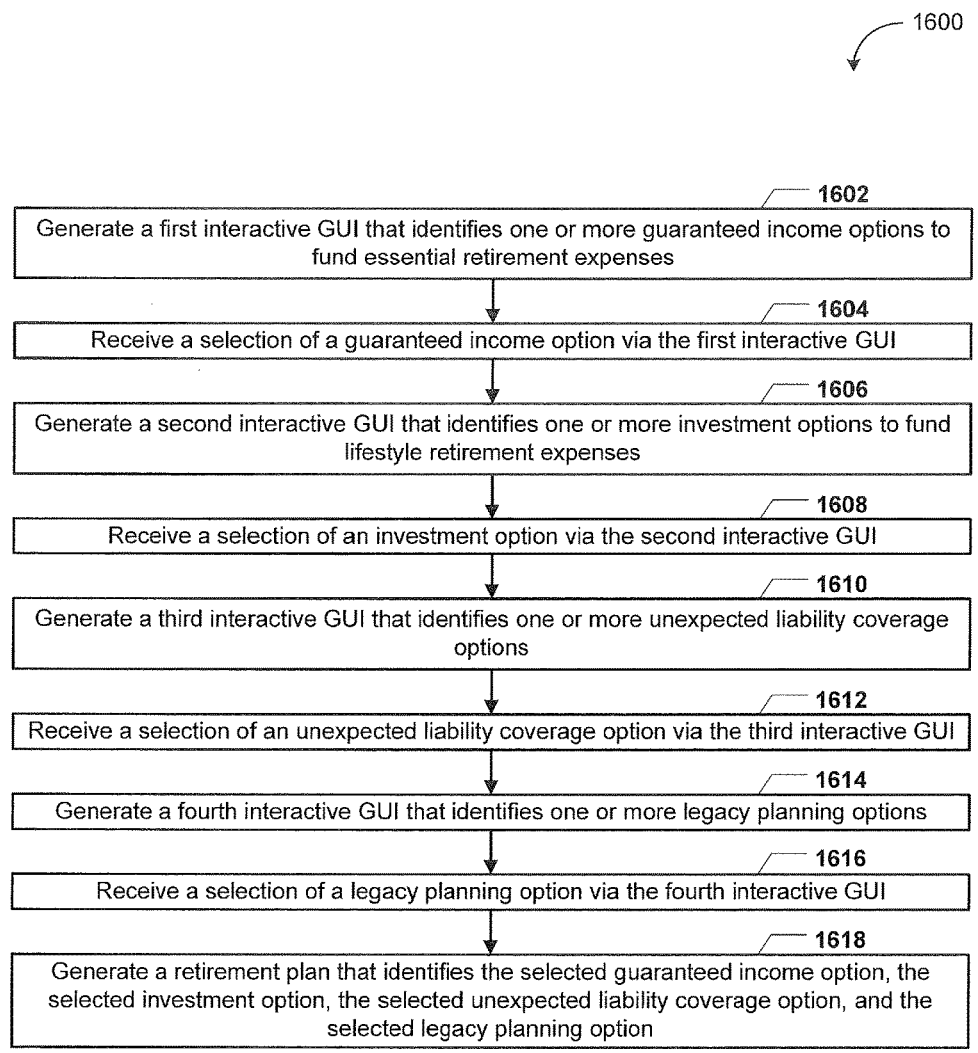
FIG. 16 is a flowchart to illustrate a particular method of generating a retirement plan for a particular client in conjunction with the described embodiments.

FIG. 16 illustrates a particular embodiment of a method 1600 associated with generating a retirement plan. In an illustrative embodiment, the method 1600 may be performed at the system 100 of FIG. 1 and may be illustrated with reference to the FIGS. 2-15.

The method 1600 may include generating a first interactive GUI that identifies one or more guaranteed income options to fund essential retirement expenses, at 1602. For example, the computing device 101 of FIG. 1 may generate an essential retirement expenses GUI, such as the GUI of FIG. 4. The method 1600 may also include receiving a selection of a guaranteed income option via the first interactive GUI, at 1604. For example, Mr. and Mrs. Smith select the CD strategy as illustrated in FIG. 4.

The method 1600 may further include generating a second interactive GUI that identifies one or more investment options to fund lifestyle retirement expenses, at 1606. For example, the computing device 101 of FIG. 1 may generate a lifestyle retirement expenses GUI, such as one of the GUIs of FIG. 5-10. The method 1600 may include receiving a selection of an investment option via the second interactive GUI, at 1608. For example, Mr. and Mrs. Smith may select a withdrawal rate and an investment plan, as illustrated in FIGS. 5-10.

The method 1600 may also include generating a third interactive GUI that identifies one or more unexpected liability coverage options, at 1610, and receiving the selection of the unexpected liability coverage option via the third interactive GUI, at 1612. For example, Mr. and Mrs. Smith may select to purchase LTC insurance, purchase an umbrella policy, and set aside an additional $25,000 for unexpected expenses, as illustrated in FIGS. 11-12.

The method 1600 may include generating a fourth interactive GUI that identifies one or more legacy planning options, at 1614, and receiving a selection of a legacy planning option via the fourth interactive GUI, at 1616. For example, Mr. and Mrs. Smith may select to use $38,000 in assets to create tax-free assets upon death, as illustrated in FIG. 13. The method 1600 may include generating a retirement plan that identifies the selected guaranteed income option, the selected investment option, the selected unexpected liability coverage option, and the selected legacy planning option, at 1618. For example, the retirement plan may be the retirement plan of FIG. 15.

Figure 17:
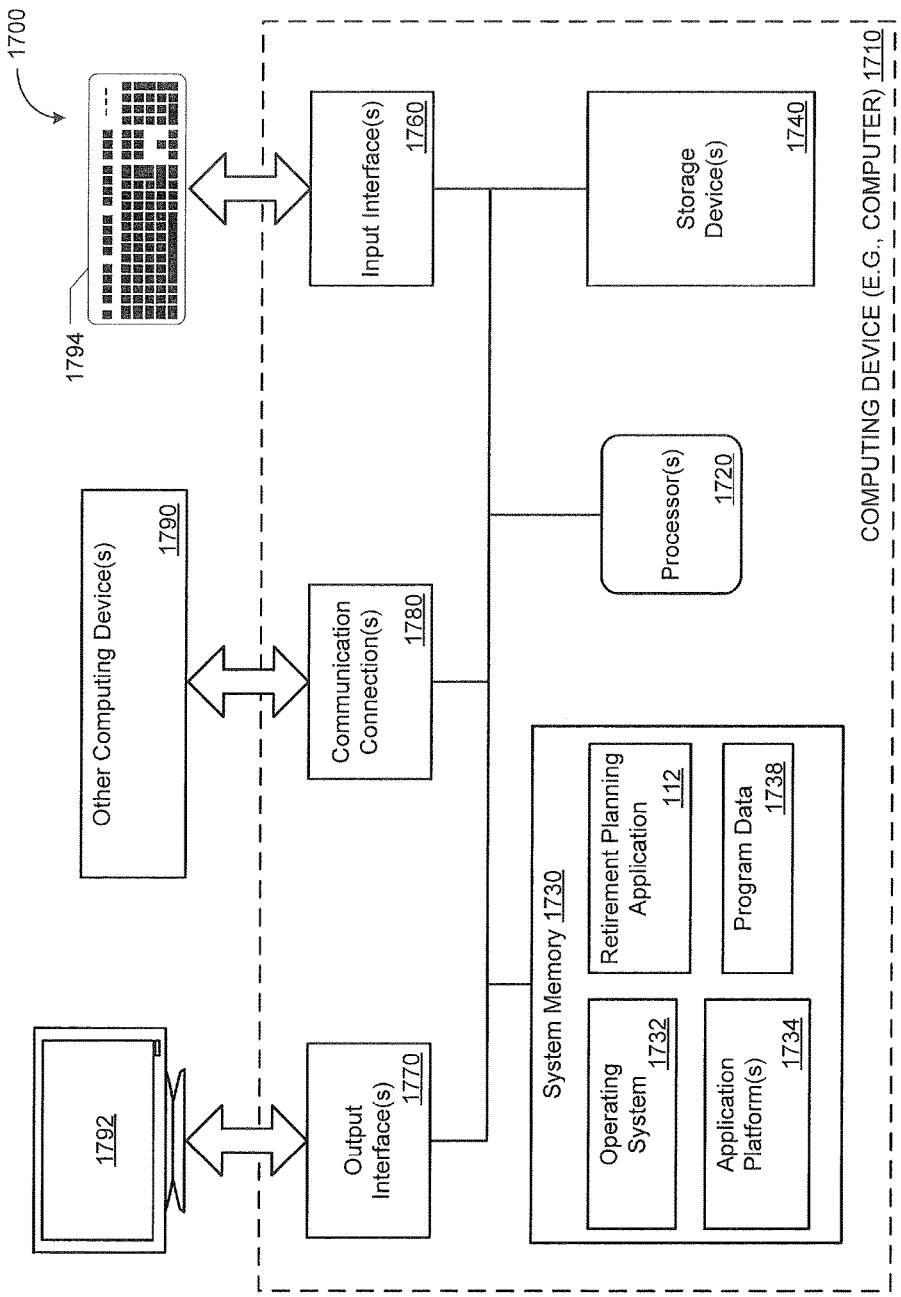
FIG. 17 is a diagram to illustrate a particular embodiment of a computing environment including a computing device that may be used to implement the methods, systems, and/or computer program products described with reference to FIGS. 1-16.

FIG. 17 is a block diagram of a computing environment 1700 including a computing device 1710 that is operable to support embodiments of computer-implemented methods, computer program products, and system components according to the present disclosure.

The computing device 1710 includes at least one processor 1720 and a system memory 1730. For example, the computing device 1710 may be a desktop computer, a laptop computer, a tablet computer, a mobile phone, a server, or any other fixed or mobile computing device. Depending on the configuration and type of computing device, the system memory 1730 may be volatile (such as random access memory or "RAM"), non-volatile (such as read-only memory or "ROM," flash memory, and similar memory devices that maintain stored data even when power is not provided), some combination thereof, or some other memory. The system memory 1730 may include an operating system 1732, one or more application platforms 1734, one or more applications, and program data 1738. In the embodiment illustrated, the system memory 1730 includes the retirement planning application 112 or executable instructions corresponding thereto. For example, the retirement planning application 112 may be executable to generate the GUIs described with reference to FIGS. 2-14, generate the retirement plan of FIG. 15, and perform the method of FIG. 16.

The computing device 1710 may also have additional features or functionality. For example, the computing device 1710 may also include removable and/or non-removable additional data storage devices, such as magnetic disks, optical disks, tape, and memory cards. Such additional storage is illustrated in FIG. 17 by storage device(s) 1740. For example, the storage device(s) 1740 may implement the client profile data 113 of FIG. 1 and the saved retirement planning sessions 114 of FIG. 1. Computer-readable or processor-readable storage media may include volatile and/or non-volatile storage and removable and/or non-removable media implemented in any technology for storage of information such as computer-readable instructions, data structures, program components or other data. The system memory 1730 and the storage device(s) 1740 are examples of computer storage media. The computer storage media includes, but is not limited to, RAM, ROM, electrically erasable programmable read-only memory (EEPROM), flash memory or other memory technology, compact disks (CD), digital versatile disks (DVD) or other optical storage, magnetic cassettes, magnetic tape, magnetic disk storage or other magnetic storage devices, and other non-transitory media that can be used to store information and that can be accessed by the computing device 1710. Any such computer storage media may be part of the computing device 1710.

The computing device 1710 may also have one or more input devices, such as an illustrative keyboard 1794, a mouse, a pen, a voice input device, a touch input device, etc. connected via one or more input interfaces 1760. One or more output devices, such as an illustrative display device 1792, speakers, a printer, etc. may also be included and connected via one or more output interfaces 1770. The input interfaces 1760 and the output interfaces 1770 may each include one or more wired or wireless interfaces, such as a universal serial bus (USB) interface, a video graphics array (VGA) interface, a serial interface, a digital visual interface (DVI), a high-definition multimedia interface (HDMI), or some other interface.

The computing device 1710 has one or more communication connections 1780 that enable the computing device 1710 to communicate with other computing devices 1790 over a wired or a wireless network. For example, when the computing device 1710 is the computing device 101 of FIG. 1, the other computing devices 1790 may include the client computer 103 of FIG. 1 and the advisor computer 105 of FIG. 1.

Particular embodiments of disclosed techniques may be implemented in conjunction with a client-server architecture. To illustrate, the computing device 1710 may be an application server or other server that hosts the retirement planning application 112. A user (e.g., the client 102 of FIG. 1) may operate a client computing device (e.g., the client computer 103 of FIG. 1) that executes a client-side application, such as a browser, to communicate with the retirement planning application 112. Alternately, the computing device 1710 may represent a client-side computing device, such as the client computer 103 of FIG. 1 or the advisor computer 105 of FIG. 1.

It will be appreciated that not all of the components or devices illustrated in FIG. 17 or otherwise described in the previous paragraphs are necessary to support embodiments as herein described. It will also be appreciated that the computing device 1710 may have additional or different components or devices than illustrated in FIG. 17 or otherwise described in the previous paragraphs.

Although the exemplary embodiments described herein are intended to enable a person skilled in the art to practice such embodiments, it should be understood that other embodiments may be realized and that logical and physical changes may be made without departing from the scope of the present disclosure. Thus, the detailed description herein is presented for purposes of illustration only and not for limitation.

For the sake of brevity, conventional data networking, application development and other functional aspects of the systems (and components of the individual operating components of the systems) may not be described in detail herein. Furthermore, the connecting lines shown in the various figures are intended to represent exemplary functional relationships and/or physical couplings between the various elements. It should be noted that many alternative or additional functional relationships or physical connections may be present in a system.

In one embodiment, portions of the present disclosure may be implemented using a system that includes a software module, logic engines, computer hardware, databases, and/ or computer networks. Moreover, while the description may make reference to specific technologies, system architectures, and data management techniques, it will be appreciated that other devices and/or methods that use different technologies, architectures, or techniques may be implemented without departing from the scope of the disclosure. Similarly, while the description may make reference to web clients, personal computers, and servers, it will be appreciated that other embodiments may include implementations using point of service (POS) devices, kiosks, handheld devices such as personal digital assistants cellular telephones, smartphones, or other devices. This disclosure is intended to cover any and all subsequent adaptations or variations of various embodiments.

The Abstract is not intended to be used in interpreting or limiting the scope or meaning of the claims. In addition, the disclosure is not to be interpreted as indicating that the claimed embodiments require more features than are expressly recited in each claim. Thus, the present disclosure is not intended to be limited to the embodiments shown herein but is to be accorded the widest scope possible consistent with the principles and novel features as defined by the following claims.

What is claimed is:

1. A server comprising:
   one or more network interfaces configured to communicate with at least a first computing device and a second computing device, the first computing device and the second computing device each located remote from the server and remote from each other;
   one or more data storage devices corresponding to a profile data store and to a session data store;
   one or more processors; and
   a memory storing instructions executable by the one or more processors, during a session with the first computing device, to:
      send, to the first computing device, a first graphical user interface (GUI) of a plurality of GUIs, the first GUI operable to receive first input, and the plurality of GUIs organized according to a paradigm of presenting a broad principle regarding a particular category of client-selectable decision categories and sub-level options for client selection within the particular category;
      store the first input in at least one of the profile data store or the session data store; and
      receive, from the first computing device, a request to pause the session;
   the instructions executable by the one or more processors, after the session is paused, to receive from the first computing device a request to resume the session; and
   the instructions executable by the one or more processors, after the session is resumed, to:
      send to the first computing device a second GUI of the plurality of GUIs, the second GUI generated based on the first input retrieved from the at least one of the profile data store or the session data store;
      facilitate two-way communication between the first computing device and the second computing device, comprising forwarding at least one of a text message, an audio message, and a video message received from one of the first computing device or the second computing device to the other of the first computing device or the second computing device; and
      store second input in the at least one of the profile data store or the session data store, the second input generated during the two-way communication between the first computing device and the second computing device;
      after storing the second input, pause the session for a second time;
      when the session is resumed for a second time, receive third input from the second computing device; and
      store the third input in the at least one of the profile data store or the session data store,
      wherein data from the profile data store and the session data store is retrievable by the server, the first computing device, and the second computing device.

2. The server of claim 1, wherein the instructions are further executable by the one or more processors to:
   include a first option in the first GUI in response to determining that the first option satisfies a first rule regarding options designated as simple, popular, reliably performing, or any combination thereof; and
   exclude a second option from the first GUI in response to determining that the second option satisfies a second rule regarding options that are designated as uncommon, have a high level of complexity, or both.

3. A method comprising:
   during a session between a server and a first computing device:
      sending, from the server to the first computing device, a first graphical user interface (GUI) of a plurality of GUIs, the first GUI operable to receive first input, and the plurality of GUIs organized according to a paradigm of presenting a broad principle regarding a particular category of client-selectable decision categories and sub-level options for client selection within the particular category, wherein the server is located remote from the first computing device;
      storing the first input in at least one of a profile data store or a session data store associated with the server; and
      receiving, from the first computing device, a request to pause the session;
   after the session is paused, receiving from the first computing device a request to resume the session; and
   after the session is resumed:
      sending to the first computing device a second GUI of the plurality of GUIs, the second GUI generated based on the first input retrieved from the at least one of the profile data store or the session data store;
      facilitating two-way communication between the first computing device and a second computing device, comprising forwarding at least one of a text message, an audio message, and a video message received from one of the first computing device or the second computing device to the other of the first computing device or the second computing device, wherein the server is located remote from the second computing device and wherein the second computing device is located remote from the first computing device;
      storing second input in the at least one of the profile data store or the session data store, the second input generated during the two-way communication between the first computing device and the second computing device;

after storing the second input, pausing the session for a second time;

when the session is resumed for a second time, receiving third input from the second computing device; and storing the third input in the at least one of the profile data store or the session data store, wherein data from the profile data store and the session data store is retrievable by the server, the first computing device, and the second computing device.

4. The method of claim 3, wherein one or both of the profile data store or the session data store are external to the server.

5. A non-transitory processor-readable storage device storing instructions that, when executed, cause a processor to perform operations comprising:

during a session between a server and a first computing device:

sending, from the server to the first computing device, a first graphical user interface (GUI) of a plurality of GUIs, the first GUI operable to receive first input, and the plurality of GUIs organized according to a paradigm of presenting a broad principle regarding a particular category of client-selectable decision categories and sub-level options for client selection within the particular category, wherein the server is located remote from the first computing device;

storing the first input in at least one of a profile data store or a session data store associated with the server; and receiving, from the first computing device, a request to pause the session;

after the session is paused, receiving from the first computing device a request to resume the session; and after the session is resumed:

sending to the first computing device a second GUI of the plurality of GUIs, wherein the second GUI is generated based on the first input retrieved from the at least one of the profile data store or the session data store;

facilitating two-way communication between the first computing device and a second computing device, comprising forwarding at least one of a text message, an audio message, and a video message received from one of the first computing device or the second computing device to the other of the first computing device or the second computing device, wherein the server is located remote from the second computing device and wherein the second computing device is located remote from the first computing device; and storing second input in the at least one of the profile data store or the session data store, the second input generated during the two-way communication between the first computing device and the second computing device;

after storing the second input, pausing the session for a second time;

when the session is resumed for a second time, receiving third input from the second computing device; and storing the third input in the at least one of the profile data store or the session data store, wherein data from the profile data store and the session data store is retrievable by the server, the first computing device, and the second computing device.

6. The non-transitory processor-readable storage device of claim 5, wherein:

the first computing device is associated with a client, the second computing device is associated with an advisor, the first input is received while the client operates the first GUI without assistance from the advisor, the second input is received based on assistance the advisor provides to the client, and the third input is received when the client visits the advisor.

* * * * *